US005690464A

United States Patent [19]

Gagnon et al.

[11] Patent Number: 5,690,464

[45] Date of Patent: Nov. 25, 1997

[54] HOLDERS FOR ARTICLE-CARRYING PALLETS AND SYSTEM FOR LOADING AND UNLOADING A STORAGE RACK WITH SUCH PALLETS

[75] Inventors: Pierre Gagnon, Outremont; Pierre Laforest, Montreal, both of Canada

[73] Assignee: Gestion Laforest Inc., St-Hubert, Canada

[21] Appl. No.: 673,780

[22] Filed: Jun. 27, 1996

Related U.S. Application Data

[62] Division of Ser. No. 354,258, Dec. 12, 1994, abandoned.

[51] Int. Cl.[6] ............ B65G 1/04

[52] U.S. Cl. ............ 414/286; 414/278; 414/280; 414/626

[58] Field of Search ............ 414/150, 152, 414/155, 157, 172, 191, 196, 267, 269, 276, 277, 278, 280, 281, 286, 458, 626; 294/67.3, 67.33

[56] References Cited

U.S. PATENT DOCUMENTS

| | | | |
|---|---|---|---|
| 1,534,863 | 4/1925 | Oliver et al. | 414/155 X |
| 2,605,004 | 7/1952 | Grueneberg | 414/155 X |
| 3,905,632 | 9/1975 | Caylor et al. | 294/67.33 X |
| 4,568,233 | 2/1986 | Baker et al. | 414/267 |
| 4,592,692 | 6/1986 | Suizu et al. | 414/626 X |
| 4,895,101 | 1/1990 | Knorr | 414/626 X |
| 5,476,180 | 12/1995 | Konstant | 414/276 |

FOREIGN PATENT DOCUMENTS

| | | | |
|---|---|---|---|
| 0715426 | 2/1980 | U.S.S.R. | 294/67.33 |

*Primary Examiner*—James W. Keenan
*Attorney, Agent, or Firm*—Francois Martineau

[57] ABSTRACT

A pair of spaced, parallel beams are designed to hold a group of aligned, contiguous article carrying pallets. Each beam has a web of uniform width with a lower, inturned flange to extend under the side edges of the aligned pallets and an upper outturned flange to be picked up by the pivoted jaws of a crane. These jaws together with a pusher/puller carriage are mounted on a long frame suspended from the crane which travels across one face of a rack in which pairs of parallel tracks are arranged in a grid. The pair of jaws, carrying the beams or pallet holders are closed to position the latter under the sides of a group of aligned, contiguous, article carrying pallets assembled at a pick-up station. The pallet carrying holders are aligned by the crane with any selected pair of tracks. One end of the frame latches to the rack and the pusher-puller carriage latches to one end of the pallet holders and pushes the same and their load off the jaws and onto the tracks. In a reverse operation, the pallet holders and their load are pulled off a pair of tracks by the carriage and transferred onto the closed jaws. The crane transports the holders and the group of article carrying pallets, to a delivery station where the jaws open to deposit the pallets. The system is designed for loading uncured concrete blocks into and unloading cured blocks from a curing kiln housing the rack.

18 Claims, 7 Drawing Sheets

60
58
104
108
88
92
94
84
89
90
24
22
98
106

108
86
58
94
92
96
100
106
102
89
88
98

HOLDERS FOR ARTICLE-CARRYING PALLETS AND SYSTEM FOR LOADING AND UNLOADING A STORAGE RACK WITH SUCH PALLETS

CROSS-REFERENCE DATA

This is a division of U.S. patent application Ser. No. 08/354,258 filed on Dec. 12, 1994 now abandoned.

FIELD OF THE INVENTION

The invention relates to holders for article-carrying pallets and a system for loading and unloading a storage rack with said pallets and holders. More particularly, the holders and loader and unloader system of the invention are used for a concrete block curing kiln.

BACKGROUND OF THE INVENTION

In known systems to load a kiln with green concrete blocks to be cured and carried by pallets is to successively push the pallets are directly pushed one against the other through pairs of parallel U-shaped guide ways extending through the kiln. The kiln is loaded at the front and the cured blocks are retrieved at the back of the kiln. It frequently happens that the pallets, which are thin, get jammed within the guide ways, one pallet tending to overlap the preceding pallet which it pushes. This problem is believed overcome by the system described and claimed in applicants' corresponding U.S. patent application Ser. No. 08/312,547 filed Sep. 26, 1994 and entitled "TRAY FOR CARRYING CONCRETE BLOCKS AND SYSTEM FOR HANDLING AND CURING CONCRETE BLOCKS ADAPTED THERETO".

In this system, trays are used, each carrying about five block carrying pallets, each tray fitted with upstanding front and back flanges to prevent tray overlap when pushed one against the other into the kiln. After block curing, the trays are extracted from the back end of the kiln. Machinery is disclosed to fill the tray with green blocks carrying pallets and to strip the trays of the dry blocks carrying pallets. As in all previously known systems, separate block loading and unloading devices must be located at the front and back faces of the kiln respectively.

In known systems for loading and unloading concrete blocks into and from a curing kiln, there is a lack of flexibility in the timing of the operations of the loading and unloading mechanisms and therefore, these systems fail to take proper care of the interruptions in the operation of the block moulding machine and of the block cuber which receives and stacks the cured blocks.

OBJECTS OF THE INVENTION

The general obect of the present invention is to provide pallet holders and a loading and unloading system of the character described which overcome the above-mentioned disadvantages of known systems especially when used for loading concrete blocks in a curing kiln and unloading the dry blocks from the same kiln.

Another object of the present invention is to provide a system of the character described which is of simpler and less expensive construction than known systems and which is also more flexible to be more adapted to the timing requirements of the moulding and cubing machines with which it is adapted to be used.

Another object of the present invention is the provision of a system of the character described in which practically the entire kiln, except its front area, may be located outside the block manufacturing building since loading as well as unloading is carried at the front face of the kiln and therefore, no block handling equipment need to be associated with the back face of the kiln.

Another object of the present invention is to provide pallet holders and a system of the character described which can be adapted to load a storage rack with articles carrying pallets and to unload said pallets from the rack.

SUMMARY OF THE INVENTION

The invention relates to holders for article-carrying pallets and a system for loading and unloading a storage rack with said pallets and holders. The holders and loader and unloader system of the invention are advantageously used for a concrete block curing kiln.

More particularly, the invention is directed to the combination of an assembly of several article-carrying pallets of uniform width in end-to-end relation with pallet holders for holding said assembly and with a storage rack having storage compartments arranged in a grid of rows and tiers, each compartment having a pair of spaced, parallel supports disposed along its length and on each side thereof, said pallet holders suspending said assembly from said supports in any selected compartment, said pallet holders comprising a pair of separate pallet carrying beams disposable along opposite sides of said assembly, the length of each beam being substantially equal to the length of said assembly, each beam defining a web of uniform width and bordered by a lower inturned longitudinal flange extending under the side edges of the pallets of said assembly and by an upper, outturned, longitudinal flange hooking onto said supports.

The combination of the present invention further comprises a system for loading and unloading said assembly into and from a selected compartment of said rack, said system including a pick-up station and a delivery station, both stations including an elongated horizontal support surface of a smaller width than the width of said assembly and on which said assembly can be supported with the sides of said pallets overhanging said support surface, and translation means to translate said beams and said assembly from said pick-up station to said selected compartment and from the latter to said delivery station and to translate said beams back to said pick-up station, said translation means including a pair of power operated jaws movable towards and away from each other to engage the underside of said upper outturned flanges of said beams and move said thus suspended beams toward each other and engage under the overhanging side edges of the pallets of said assembly at said pick-up station and to move said suspended beams away from each other to disengage from under the overhanging side edges of the pallets of said assembly at said delivery station and then to return said suspended beams to said pick-up station.

Preferably, each pair of supports is a pair of tracks, said translation means further including a travelling crane and pusher and puller means, said pair of power operated jaws and said pusher and puller means suspended from said travelling crane, said travelling crane operable to align the beams suspended from said jaws with one end of any selected pair of tracks and said pusher and puller means capable of pushing said suspended beams onto said selected pair of tracks completely within said rack to suspend said beams from said selected pair of tracks by their upper outturned flanges and leave said beams together with the article-carrying pallets suspended thereon on said selected pair of tracks in stored position while said translating means move out of alignment with and away from said selected pair of tracks, and to pull said pallet-carrying beams from said selected pair of tracks onto said jaws when said jaws are again in alignment with said selected pair of tracks.

Preferably, said pusher and puller means include an elongated frame, rails carried by said elongated frame, a carriage mounted on said rails for movement towards and away from said tracks, reversible driving means mounted on said elongated frame and driving said carriage, said jaws pivoted to both sides of said elongated frame, a first pair of hook means movably carried by said elongated frame to hook onto said rack and retain said frame against movement away from said one end of said selected pair of tracks and retain said frame in a position in which said beams, when held by said jaws are in alignment with said selected pair of tracks, said carriage including a second pair of hook means releasably engageable with one end of said pair of beams to push and pull said elements onto and from said selected pair of tracks by movement of said carriage longitudinally of said frame.

Preferably, the lower flange of each beam is normal to the web and the upper flange is downwardly inclined relative to said web and said rack includes spaced posts and each pair of tracks are secured to the facing side of pairs of posts, each track being a channel defining a bottom flange and a downwardly inclined upper flange extending away from said posts to engage under the inclined top flange of one of said beams while the bottom flange of said track abutting against said web maintains the lower flange of said one beam under said pallets.

Advantageously, the combination includes a feeding conveyor means to sequentially advance individual article carrying pallets and to arrange said pallets in contiguous alignment at said pick-up station and a retrieving conveyor means at said delivery station.

Preferably, the combination further includes, at said pick-up station, a first accumulator means which includes means to raise a group of said article carrying pallets in contiguous alignment on said feeding conveyor means to a position above said feeding conveyor means so as to allow continued advancement of successive article carrying pallets by said feeding conveyor means under the raised group of article carrying pallets, said raised group of pallets being said assembly of pallets.

Advantageously, the combination further includes a second accumulator means located at said delivery station and including means to lower onto said retrieving conveyor means an assembly of article carrying pallets delivered at said delivery station.

Preferably, said rack is located in a concrete block curing kiln, and the articles carried by said pallets at said pick-up station are uncured concrete blocks while the articles carried by said pallets at said delivery station are cured concrete blocks.

DESCRIPTION OF THE DRAWINGS

In the annexed drawings.

In the annexed drawings, like references indicate like elements throughout.

DETAILED DESCRIPTION OF THE PREFERRED EMBODIMENT

Figure 1:
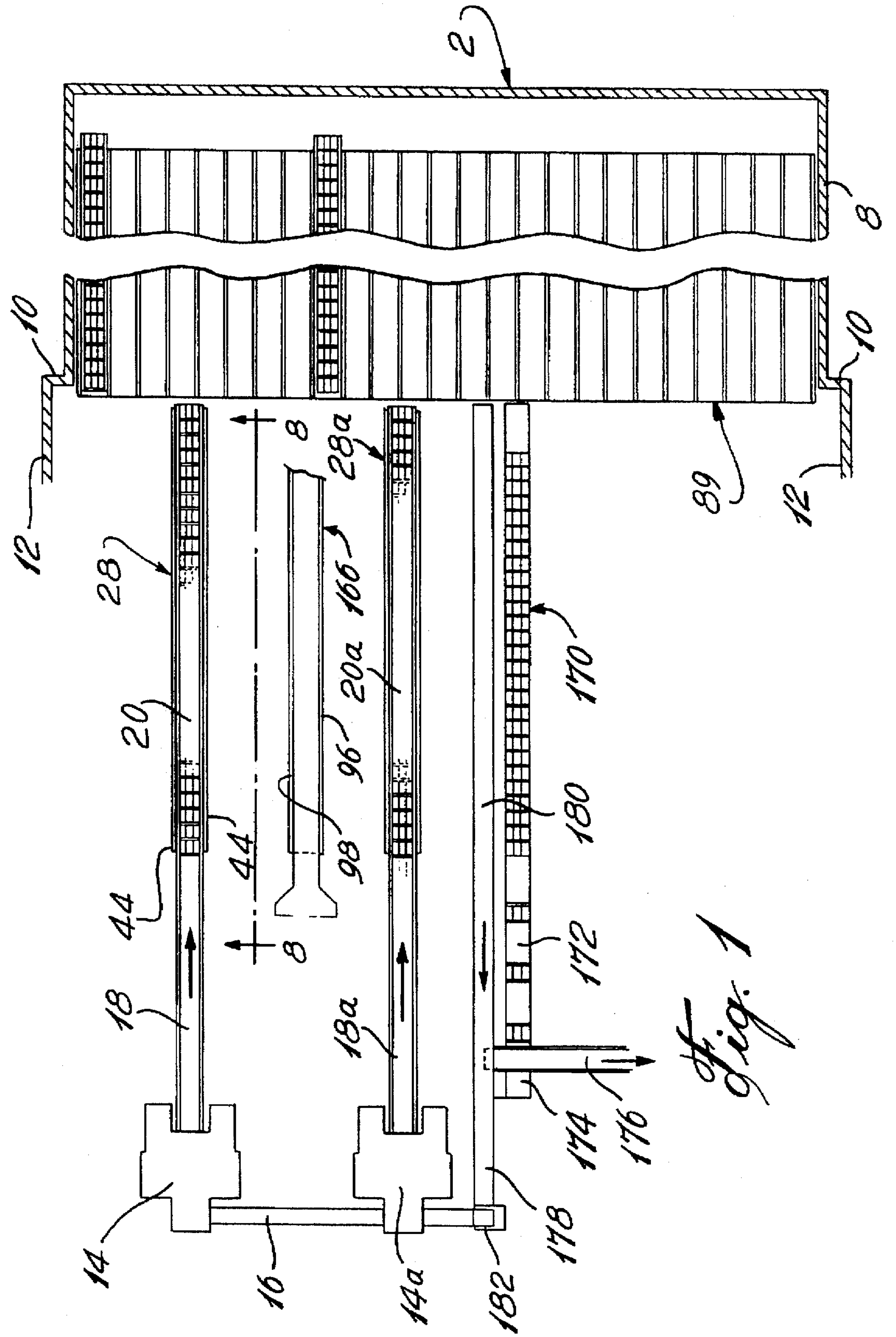
FIG. 1 is a schematic top plan view of the general layout of a concrete block handling and curing system incorporating the invention.
Figure 2:
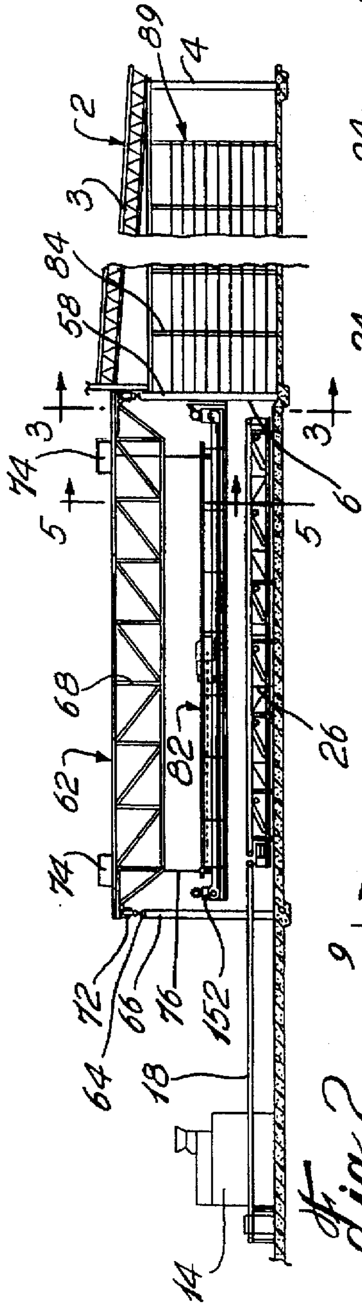
FIG. 2 is a side elevation of the same.

Referring to FIGS. 1 and 2, there is shown a concrete block curing kiln 2 which has a roof 3, a back wall 4, a front 6 and side walls 8 which are connected at 10 to the main walls 12 of the building in which the block manufacturing equipment is located. This equipment includes at least one, and preferably two, conventional block moulding machines 14, 14*a*, each receiving empty pallets from an empty pallet conveyor 16, and depositing freshly moulded or green blocks on a green block conveyor 18, 18*a* which is arranged normal the front and back of the kiln 2 and in front of said kiln. The green block carrying pallets are conveyed in the direction of the kiln, and upon reaching a trailing conveyor section 20, 20*a* they come in contiguous alignment, as clearly shown in dotted lines in FIG. 8 wherein the pallets are shown at 22 and the green blocks at 24.

Trailing section 20 is fitted with a green block accumulator system generally indicated at 26, the function of which is to raise a predetermined number of green block carrying pallets 22 above the trailing section 20, to thus allow successive green block carrying pallets 22 coming from the block moulding machine 14 to accumulate on the trailing conveyor section 20 below the raised blocks and pallets which are now located at a pick-up station 28 and ready to be transferred and loaded into kiln 2.

Figure 8:
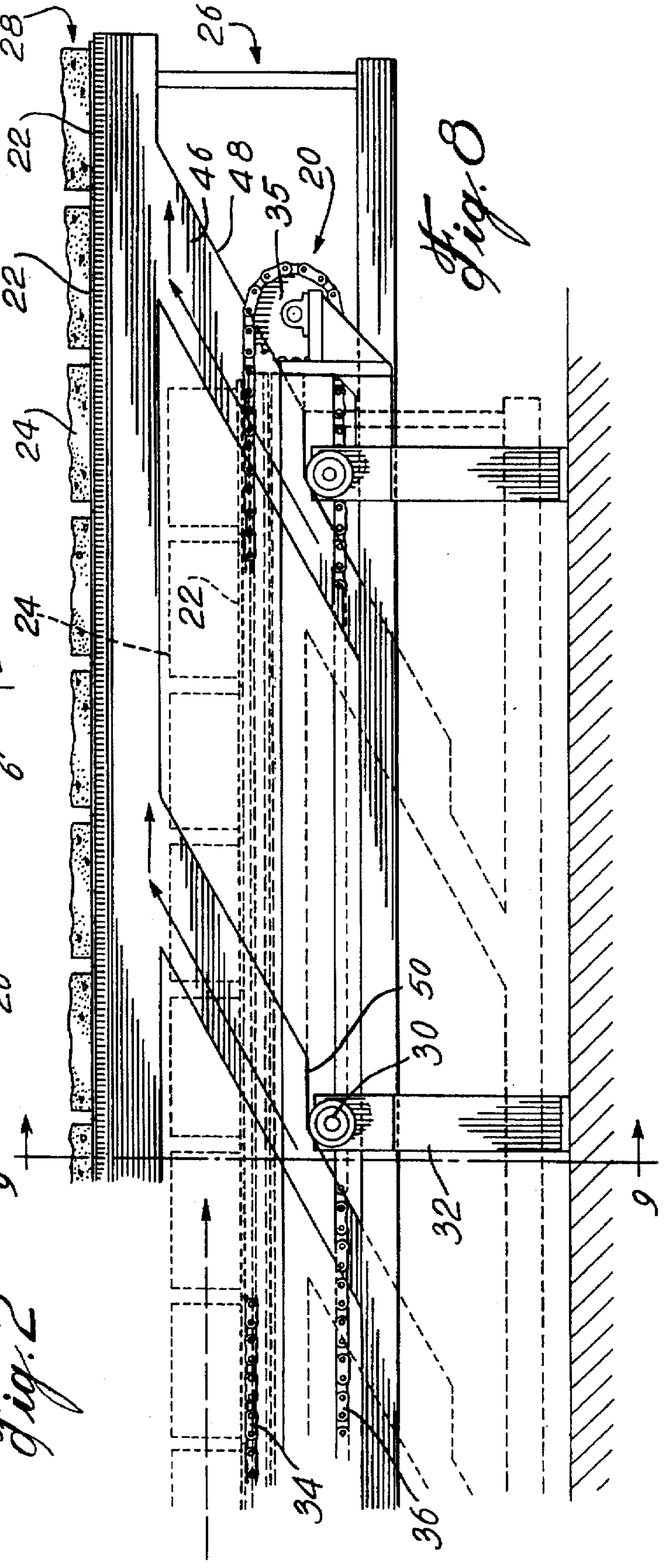
FIG. 8, shown on the first sheet of drawings, is a partial side elevation of the accumulator for the green blocks.
Figure 9:
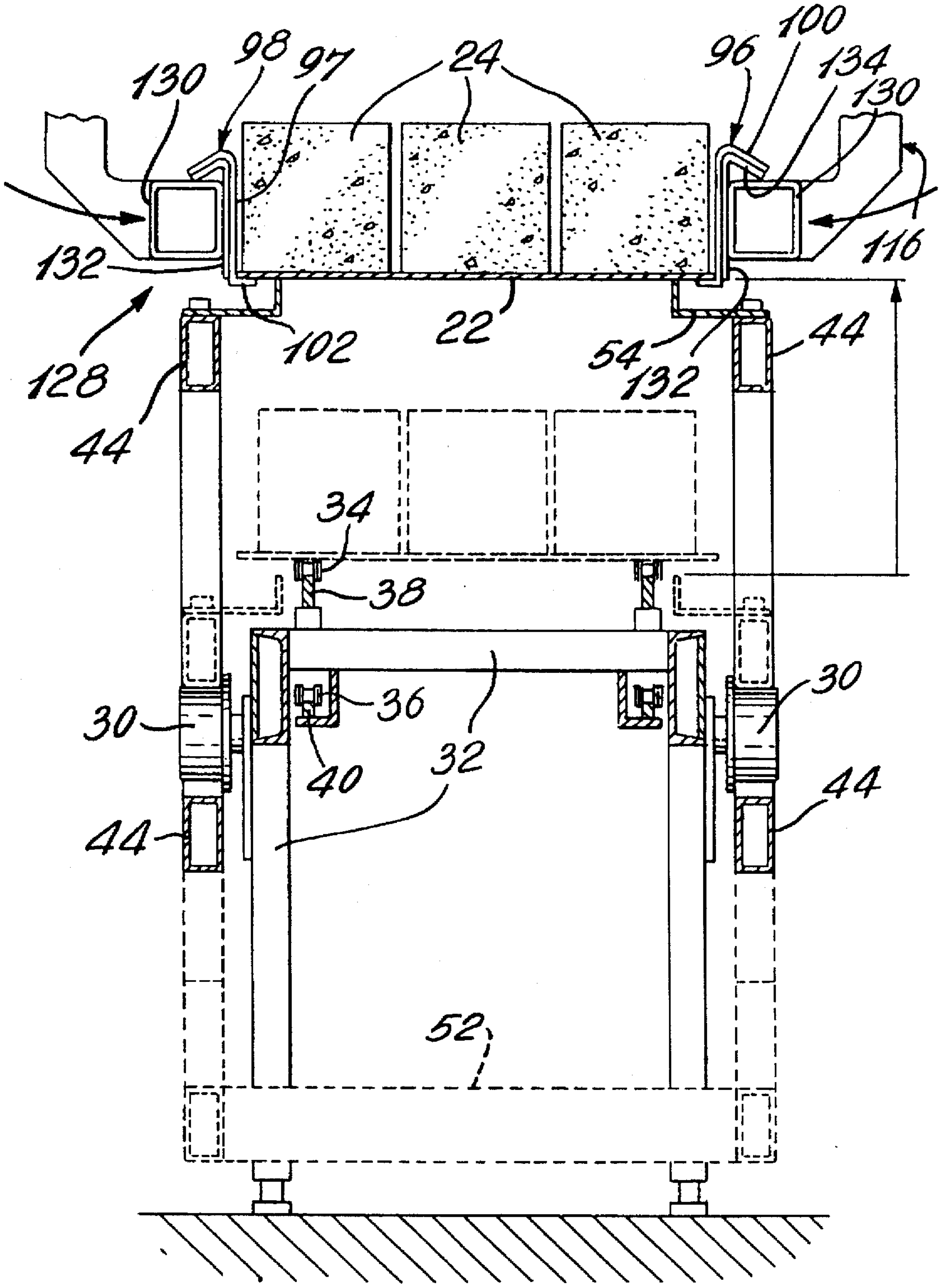
FIG. 9 is a cross-section taken along line 9—9 of FIG. 8.

Accumulator 26 shown in FIGS. 8 and 9 basically consists in pairs of coaxial idle rollers 30 carried by conveyor supporting frame 32 on each side of the trailing conveyor section 20 which includes the top advancing chain run 34, idle sprockets 35 and bottom chain return run 36; the chain runs 34 and 36 are supported and guided by an upper set of guides 38 and lower a set of guides 40 respectively. A pair of lifting frames 44 are mounted on each side of the conveyor section 20 and extends substantially the entire length of the same, each lifting frame 44 defines several inclined parallel, cam members 46 which have a lower roller engageable edge 48 with a step 50. The two lifting frame 44 are cross-connected by cross members 52. A pallet support 54 is carried by the top of the lifting frames 44 and in the lowered position of these lifting frames, pallet supports 54 extend underneath the side edges of the pallets 22 accumulated on the pallet trailing section 20, it being noted that the pallet side edges overhang supports 54. Upon elevating movement of the lifting frames, the pallets 22 are lifted from the lowered position, shown in dotted line in FIG. 9, to the full line position of FIG. 9 where they are stabilized since rollers 30 engage steps 50. In this movement, the lifting frames remain parallel to themselves due to the parallel arrangement of the inclined cam edges 48 which ride on the idle rollers 30 under the action of a horizontally disposed hydraulic cylinder (not shown) one end of which is attached to the assembly of the two lifting frames and the other end of which is attached to the framework 32. Obviously, there is a system (not shown) to move the top supports 54 laterally, outwardly so as to clear the lateral edges of the pallets 22 accumulating on the conveyor trailing section 20 once the set of pallets 22 at pick-up station 28 has been picked up which usually occurs after successive block carrying pallets 22 have started to accumulate on the underlying trailing conveyor section 20.

The front face 6 of kiln 2 (FIGS. 2, 3 and 4) is formed of a series posts 58 equally spaced from each other and supporting a transverse rail 60 for a travelling crane 62. Another rail 64, parallel to rail 60, is supported by posts 66. The travelling crane 62 is movable across the entire front face 6 of the kiln 2 in a direction parallel to said front face. Travelling crane 62 (see FIGS. 2 and 5) is composed of a pair of crane trusses 68 interconnected at both ends by cross beams 70 carrying motorized wheels 72 travelling on the rails 60 and 64. Each end of the pair of crane trusses 68 support a motorized lifting apparatus 74 including two pairs of upwardly diverging hoisting cables 76 which suspend by anchor members 80 a combined transfer and pusher/puller system generally indicated at 82. The diverging pairs of hoisting cables 76 stabilize the transfer pusher/puller 82 in a direction transverse to the latter but stabilization is not required in a longitudinal direction.

Referring to FIGS. 1 to 4, the kiln posts 58 at the front face of the kiln together with additional kiln posts 84 in respective alignment with the posts 58 and spacedly along the entire length of the kiln, support pairs of tracks 86, 88 which are parallel to each other and which extend longitudinally practically the entire length of the kiln from the front kiln posts 58 to just short of the back wall 4. The pairs of tracks 86, 88 are all parallel to one another and are disposed in horizontal rows and tiers, one such tier being shown in FIG. 4, rows being schematically shown in FIG. 1. The assembly of posts 58, 84 and tracks 86, 88 constitute a storage rack 89 located within kiln 2. Each track 86 is a mirror image of the associated track 88; each consists of a channel member with the web disposed vertically and secured by bolts 90 to the respective posts 58, 84; each track has a top flange 92 and a bottom flange 94; the top flanges 92 of tracks 86, 88 are downwardly inclined in a laterally diverging direction while the bottom flanges 94 are substantially horizontal. Each track is designed to support a pallet holder 96, 98 respectively, each pallet holder is in the form of a rigid beam of about the same length as the length of tracks 86, 88 and therefore of the assembly of the maximum number of article-carrying pallets 22 arranged in end-to-end relation. Each beam includes a web 97 of uniform width and provided with an outturned top inclined flange 100 which is adapted to overlie the top flange 92 of the slides 86, 88 and which conforms thereto.

Each pallet holder 96, 98 furthermore has an inturned bottom flange 102 normal to web 97 adapted to underlie and support the sides of a series of pallets 22. The pallet holders 96, 98, one on each side of a predetermined number of pallets 22 carrying green blocks 24, are adapted to be pushed by the transfer pusher/puller apparatus 82 onto the tracks 86 and 88 to a final position (as shown on the bottom tier in FIG. 3) wherein the holders 96, 98 support a predetermined number of green block carrying pallets 22 inside the kiln where the blocks are cured by steam injection.

Figure 3:
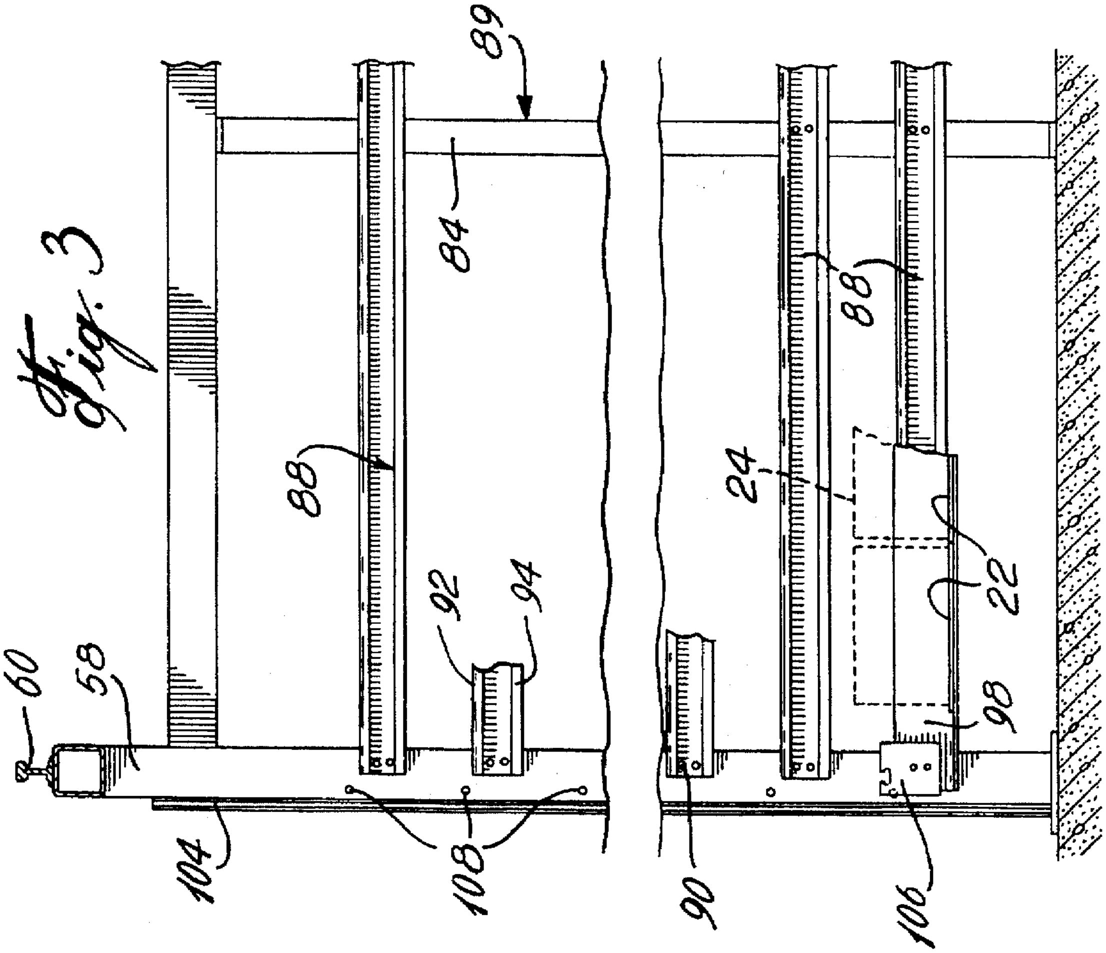
FIG. 3 is a partial section through the rack of the kiln taken along line 3—3 of FIG. 2.

As shown in FIG. 3, each pair of front kiln posts 58 carries a vertical guideway 104 which serves to receive closure panels (not shown) which can be slid up and down in known manner by a device (not shown) mounted on suspended apparatus 82, (see U.S. Pat. No. 4,016,986 dated Apr. 12, 1977), to form an access opening for a preselected pair of slides 86, 88, this opening allowing pushing a pair of pallet carrying holders 96, 98 through the access opening and onto the aligned tracks 86, 88.

Figure 4:
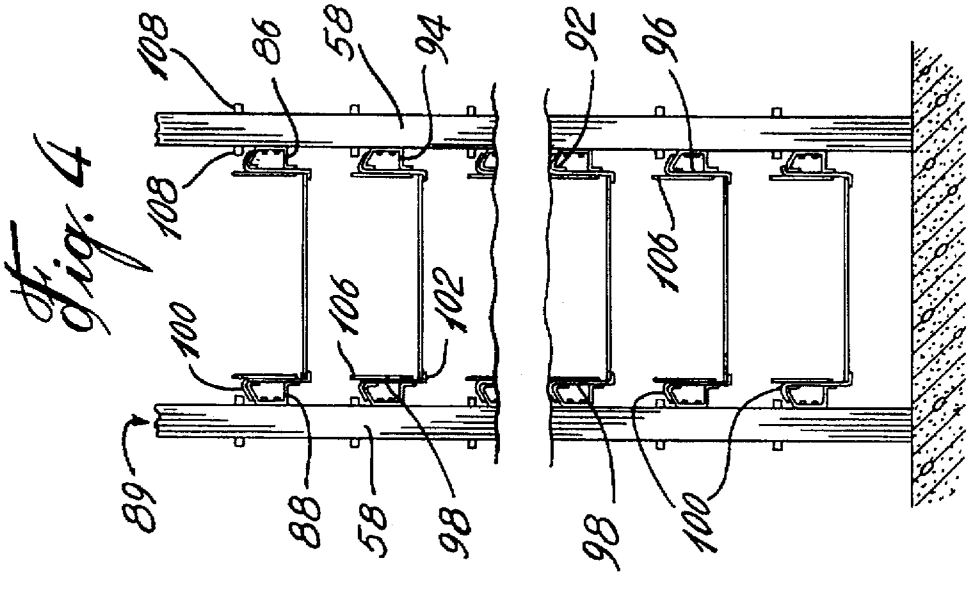
FIG. 4 is a partial front elevation of one tier or bay of the kiln rack and looking at the front face of the kiln.
Figure 5:
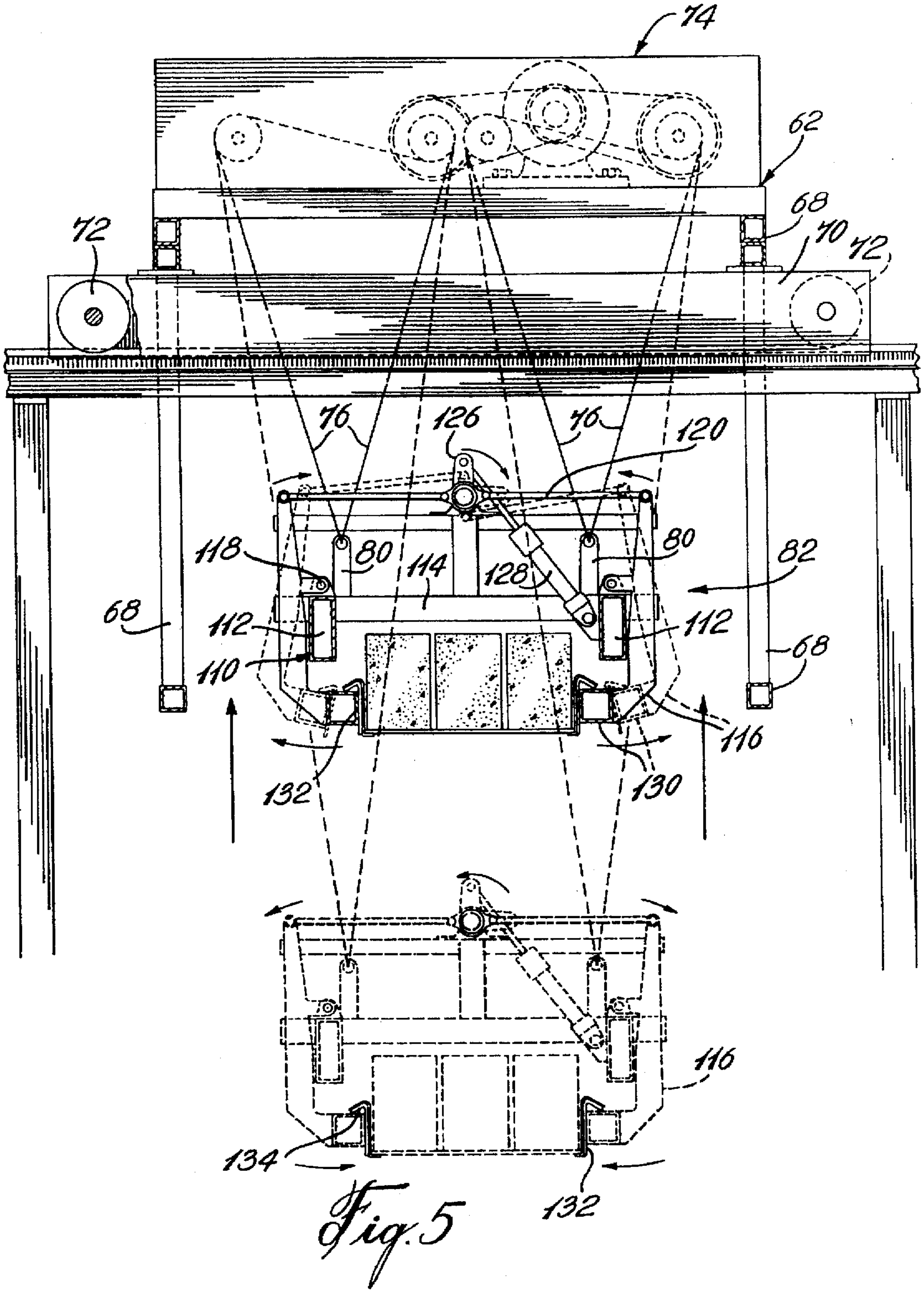
FIG. 5 is a cross-section taken along line 5—5 of FIG. 2 and showing the travelling crane and the jaws of the pusher/puller, the front face of the kiln not being shown.

Referring to FIG. 4, the bottom flanges 94 of the tracks abut against the pallet holders 96, 98 to stabilize the same in a vertical plane with the co-action of the pallets 22 themselves. The front end of the pallet holders 96,98 is fitted with a hooking plate 106 secured thereto and which serves to push and pull the related pallet holder 96, 98 in the manner to be described.

Each kiln post 58 is further provided with a set of oppositely disposed anchoring pins 108 forming pairs of such pins which are directed towards each other and at same level above an associated pair of slides or tracks 86, 88.

The transfer pusher/puller 82 suspended from the hoisting cables 76 is more particularly shown in FIGS. 2, 5, 6, 7 and 10. It includes a generally rectangular frame 110 composed of two longitudinal frame members 112 as long as the pallet holders 96, 98 and interconnected by cross members 114 to which the anchors 80 are secured. A pair of jaws 116, which are transversely opposite each other, are pivotally connected at 118 to the longitudinal frame members 112. The jaws 116 are movable towards and away from each other about pivot connections 118 under the action of links 120 connected to a radial arm 126 which is rotated by a double-acting hydraulic cylinder 128. Each jaw 116 includes a longitudinally extending beam 130 to which is secured a longitudinally extending holder support 132 defining a downwardly inclined upper flange 134 conforming to and adapted to receive and support the outturned top flange 100 of pallet holders 96, 98.

Transfer pusher/puller 82 further includes a pair of rails 136 secured to and extending inwardly from the respective longitudinal frame members 112 and along which a carriage 138 is longitudinally movable by means of its top and bottom rail engaging rollers 140. The carriage 138 is in the form of a plate extending transversely of the longitudinal frame members 112, each end of this carriage is attached at 142 to the lower run of a driving chain 144 which is trained on an idle sprocket 148 carried by the forward end of the frame members 112. The rear end of the driving chain is trained on a driving sprocket driven by a reversible motor and speed reducer mounted at the rear end of the frame 110 as shown at 152 in FIG. 2.

Figures 6, 10:
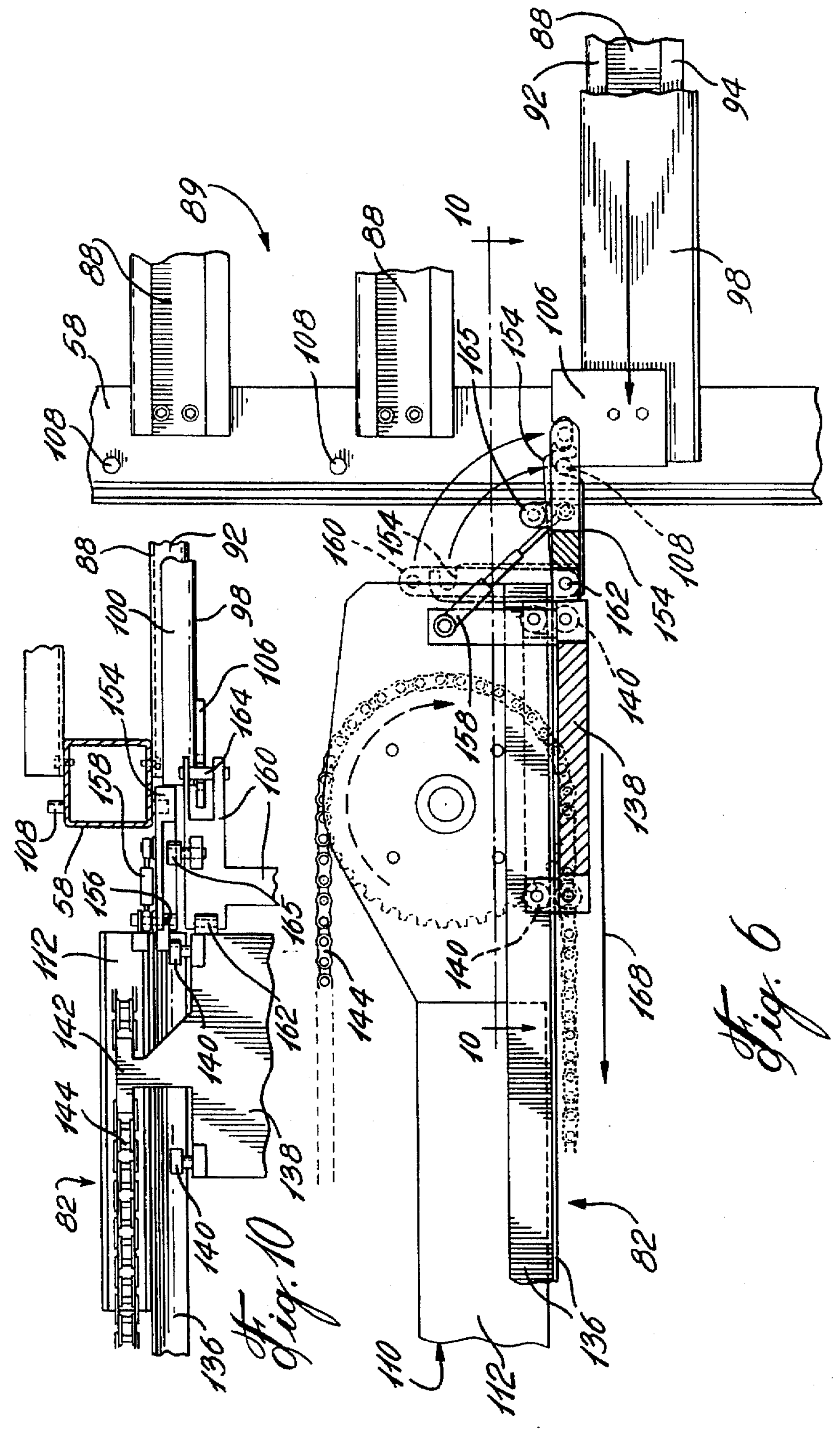
FIG. 6 is a partial longitudinal section of the pusher/puller and of the front part of the kiln rack showing the pallet holders within the kiln, the pusher/puller starting to pull the pallet holders.
FIG. 10 is a partial top plan view taken along line 10—10 of FIG. 6.
Figure 7:
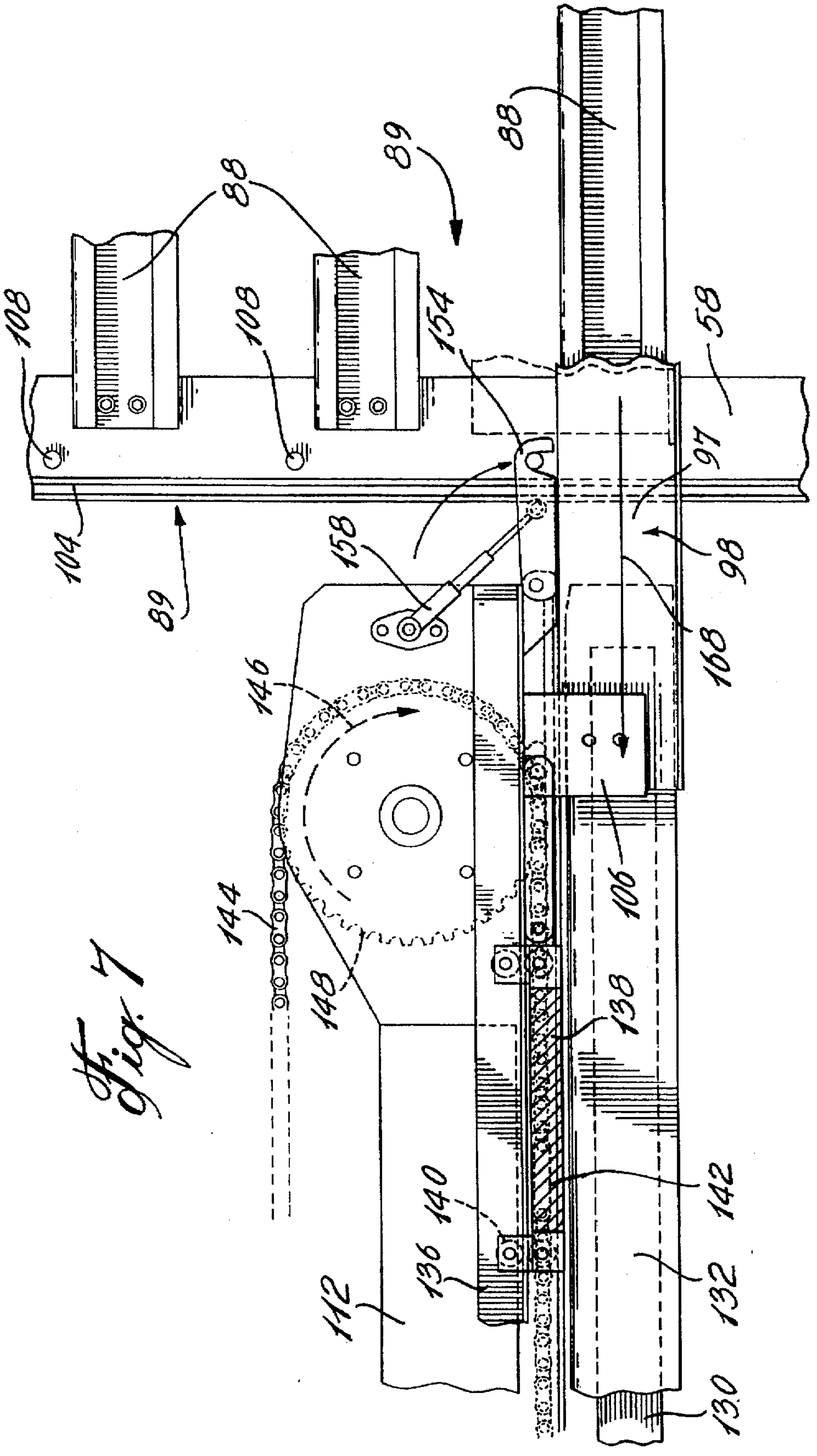
FIG. 7 is a view similar to that of FIG. 6 but showing the pusher/puller having partially pulled the pallet holders out of the kiln.

Referring to FIGS. 6, 7 and 10, a pusher/puller latching hook 154 is pivoted at 156 to the front end of each frame member 112 for vertical movement under the action of double-acting hydraulic telescopic cylinder 158 between a lowered position engaging the respective anchoring pins 108 and an upright position releasing said anchoring pins. In the lowered, latching position, transfer pusher/puller apparatus 82 is completely stabilized with respect to the kiln posts 58. Carriage 138 further carries a pusher/puller lever 160 which is pivoted at 162 to each end of the carriage, which extends transversely along the front edge of the carriage and which includes, at each end, an anchoring pin 164 engageable with the top notch of the hook plate 106 carried by the respective pallet holders 96, 98.

The centre of the pusher/puller lever 160 is connected to an operating double-acting hydraulic cylinder (not shown) for vertical movement between a lowered position in which the anchor pins 164 engage the top notch of hook plate 106 and an upper position (shown in dotted line in FIG. 6) releasing the hooking plate 106. Each end of lever 160 carries a roller 165 which rides over the lowered latching hook 154 to stabilize lever 160 when pushing or pulling pallet holders 96, 98.

The system operates as follows: Once a group of green block carrying pallets 22 have been accumulated in the trailing conveyor section 20 of feeding conveyor 18, it is raised by the lifting frames 44 of the accumulator 26 to the pick-up station 28. The travelling crane 62 is brought above this pick-up station and the transfer pusher/puller 82 is lowered by the hoisting cables 76 and jaws 116, which carry the pallet holders 96, 98 are closed to cause lower inturned flanges 102 of holders 96, 98 to engage to underside of all the pallets 22 at the pick-up station. Normally, the number of pallets in the group which is picked-up is equal to the holding capacity of holders 96, 98, which capacity is in turn equal to the holding capacity of any selected pair of tracks 86, 88 in kiln 2.

The apparatus 82 is then raised by the hoisting cables 76. The lifting frames 44 of the accumulator 26 are lowered to their lowermost position (shown in dotted line in FIG. 9) to allow successive green block carrying pallets 22 to accumulate in end to end contiguous relation on the trailing conveyor section 20.

The travelling crane 62 moves on rails 60 and 64 to an indexed position and transfer pusher/puller 82 is raised or lowered to come in longitudinal alignment with a selected empty set of tracks 86, 88 within the kiln 2. During travelling of the crane, it is noted that transfer pusher/puller 82 is not subjected to a swinging movement towards and away from the kiln and is stabilized against transverse movement due to the V-shaped arrangement of the hoisting cables 76. Once pallet holders 96,98 carried by jaws 116 are in alignment with a selected empty pair of tracks 86, 88, the pusher/puller latching hooks 154 are operated by the hydraulic cylinders 158 to engage the anchor pins 108 carried by the front kiln posts 58. In this position, the pallet holder supports 132 carried by the jaws 116 are in exact alignment with the respective tracks 86, 88 of the kiln 2. It is noted that the drive 152 has previously operated the driving chains 144 to retract the carriage 138 to a position in which pusher lever 160 can be pivoted to engage the hook plates 106 of the pallet holders 96, 98 which are held by jaws 116 and are coextensive therewith. Rollers 140, 165 ride on tracks 136 during advancing and retracting movement of carriage 138. The advancing carriage pushes the holders 96, 98 onto the respective tracks 86, 88, the pallet holders 96, 98 together with their load, are pushed all the way towards the back wall 4 of the kiln 2.

The pusher/puller levers 160 and the latching hooks 154 are raised to release hook plates 106 and anchoring pins 108 respectively, and the travelling crane together with its suspended transfer pusher/puller apparatus 82 can then be moved to vertically register with a holder pick-up station shown at 166 in FIG. 1 where another set of pallet holders 96, 98 are held in a ready position to be picked up by jaws 116 and then transferred to the pick-up station 28 where the jaws 116 are closed to engage underneath the set of green block carrying pallets already accumulated at that station.

The kiln loading of another set of green block carrying pallets can be repeated as already described.

Normally, each time a kiln compartment is loaded, another compartment is emptied, the travelling crane 62 moves to bring apparatus 82 in alignment with the set of tracks 86, 88 to be emptied of cured or dry blocks; after latching of hook levers 154, 160, the dry blocks together with their pallet holders are pulled out of the kiln in a reverse operation, this operation being shown by the arrows 168 in FIGS. 6 and 7 the idle sprockets 148 then revolving in the direction of arrow 146.

The dry blocks are transferred to a delivery station 170 constituted by another accumulator 26, the jaws 116 are moved apart and the dry blocks together with their pallets are deposited on the raised lifting frames 44 of the accumulator 26. The pallet holders 96, 98 are then transferred to the pick-up station 28 ready to repeat a loading operation.

The dry blocks together with their pallets are transferred to a dry block conveyor 172; the dry blocks and their pallets enter a conventional pallet stripper 174, the dry blocks travelling on a conveyor 176 to a concrete block cuber (not shown) while the empty pallets are deposited on a conveyor 178 which may have a pallet accumulator section 180. The empty pallets travel to an auxiliary pallet magazine and pallet turnover machine of known construction and indicated at 182, the turned over pallets are then fed back to block moulding machines 14 and/or 40*a* and the cycle is repeated.

From the foregoing, it appears that each kiln compartment, namely tracks 86, 88 can be fully loaded or fully emptied in one operation by means of the full length pallet holders 96, 98. The loading and unloading operation is carried out solely at the front face of the kiln and therefore, the kiln may extend outwardly of the building provided its roof and side walls are properly insulated.

The system avoids the duplication of mechanisms for loading the kiln on the one hand and unloading the same since the same apparatus is used for loading and unloading. The system is highly flexible in that it provides for accumulation of green blocks and dry blocks by means of the accumulators 26 and also by the fact that a whole set of empty pallets can be loaded onto any selected empty set of tracks 86, 88 should the need arise.

The system can be arranged to have a kiln curing capacity normally designed for the output of a main block molding machine 14, but the same block handling apparatus can be used to pick up blocks at another pick-up station 28*a* from a block moulding machine 14*a* which can have less capacity than machine 14.

Green blocks and dry blocks can be accumulated in accumulators 26 in the event of a temporary stoppage of either the block machine 14 or of the cuber fed by conveyor 176. Acceleration and deceleration movement of the green block carrying pallets can also be much more easily controlled than in previously known kiln loading and unloading systems. Accumulators 26 can be dispensed with, in which case the pick-up stations 28, 28*a* and delivery station and 170 are conveyors 20, 20*a* and 172, respectively.

Obviously, the same system could be used for loading and unloading a storage rack with pallets carrying other articles than concrete blocks.

I claim:

1. The combination of an assembly of several article-carrying pallets of uniform width and in end-to-end relation, with pallet holders for holding said assembly and with a storage rack having storage compartments arranged in a grid of rows and tiers, each compartment having a pair of spaced, parallel supports disposed along its length and on each side thereof, said pallet holders suspending said assembly from said supports in any selected compartment, said pallet holders comprising a pair of separate, pallet carrying beams disposable along opposite sides of said assembly, the length of each beam being substantially equal to the length of said assembly, each beam defining a web of uniform width and bordered by a lower, inturned, longitudinal flange extending under the side edges of the pallets of said assembly and by an upper, outturned, longitudinal flange hooking onto said supports.

2. The combination as defined in claim 1, further comprising a system for loading and unloading said assembly into and from a selected compartment of said rack, said system including a pick-up station and a delivery station, both stations including an elongated horizontal support surface of a smaller width than the width of said assembly and on which said assembly can be supported with the sides of said pallets overhanging said support surface, and translation means to translate said beams and said assembly from said pick-up station to said selected compartment and from the latter to said delivery station and to translate said beams back to said pick-up station, said translation means including a pair of power operated jaws movable towards and away from each other to engage the underside of said upper outturned flanges of said beams and move said thus suspended beams toward each other and engage under the overhanging side edges of the pallets of said assembly at said pick-up station and to move said suspended beams away from each other to disengage from under the overhanging side edges of the pallets of said assembly at said delivery station and then to return said suspended beams to said pick-up station.

3. The combination as defined in claim 2, wherein said rack is located in a concrete block curing kiln, and the articles carried by said pallets at said pick-up station are uncured concrete blocks while the articles carried by said pallets at said delivery station are cured concrete blocks.

4. The combination as defined in claim 2, wherein each pair of supports is a pair of tracks, said translation means further including a travelling crane and pusher and puller means, said pair of power operated jaws and said pusher and puller means suspended from said travelling crane, said travelling crane operable to align the beams suspended from said jaws with one end of any selected pair of tracks and said pusher and puller means capable of pushing said suspended beams onto said selected pair of tracks completely within said rack to suspend said beams from said selected pair of tracks by their upper outturned flanges and leave said elements together with the article-carrying pallets suspended thereon on said selected pair of tracks in stored position while said translating means move out of alignment with and away from said selected pair of tracks, and to pull said pallet-carrying beams from said selected pair of tracks onto said jaws when said jaws are again in alignment with said selected pair of tracks.

5. The combination as defined in claim 4, further including, at said pick-up station, a first accumulator means which includes means to raise a group of said article carrying pallets in contiguous alignment on said feeding conveyor means to a position above said feeding conveyor means so as to allow continued advancement of successive article carrying pallets by said feeding conveyor means under the raised group of article carrying pallets, said raised group of pallets being said assembly of pallets.

6. The combination as defined in claim 5, further including a second accumulator means located at said delivery station and including means to lower onto said retrieving conveyor means an assembly of article carrying pallets delivered at said delivery station.

7. The combination as defined in claim 4, wherein said rack is located in a concrete block curing kiln, and the articles carried by said pallets at said pick-up station are uncured concrete blocks while the articles carried by said pallets at said delivery station are cured concrete blocks.

8. The combination as defined in claim 4, wherein said pusher and puller means include an elongated frame, rails carried by said elongated frame, a carriage mounted on said rails for movement towards and away from said tracks, reversible driving means mounted on said elongated frame and driving said carriage, said jaws pivoted to both sides of said elongated frame, a first pair of hook means movably carried by said elongated frame to hook onto said rack and retain said frame against movement away from said one end of said selected pair of tracks and retain said frame in a position in which said beams, when held by said jaws are in alignment with said selected pair of tracks, said carriage including a second pair of hook means releasably engageable with one end of said pair of beams to push and pull said elements onto and from said selected pair of tracks by movement of said carriage longitudinally of said frame.

9. The combination as defined in claim 8, wherein said rack is located in a concrete block curing kiln, and the articles carried by said pallets at said pick-up station are uncured concrete blocks while the articles carried by said pallets at said delivery station are cured concrete blocks.

10. The combination as claimed in claim 8, wherein for each beam said lower flange is normal to said web and said upper flange is downwardly inclined relative to said web and wherein said rack includes spaced posts and each pair of tracks are secured to the facing side of pairs of posts, each track being a channel defining a bottom flange and a downwardly inclined upper flange extending away from said posts to engage under the inclined top flange of one of said beams while the bottom flange of said track abutting against said web maintains the lower flange of said one beam under said pallets.

11. The combination as defined in claim 10, wherein said rack is located in a concrete block curing kiln, and the articles carried by said pallets at said pick-up station are uncured concrete blocks while the articles carried by said pallets at said delivery station are cured concrete blocks.

12. The combination as defined in claim 8, further including a feeding conveyor means to sequentially advance individual article carrying pallets and to arrange said pallets in contiguous alignment at said pick-up station and a retrieving conveyor means at said delivery station.

13. The combination as defined in claim 12, wherein said rack is located in a concrete block curing kiln, and the articles carried by said pallets at said pick-up station are uncured concrete blocks while the articles carried by said pallets at said delivery station are cured concrete blocks.

14. The combination as defined in claim 12, further including, at said pick-up station, a first accumulator means which includes means to raise a group of said article carrying pallets in contiguous alignment on said feeding conveyor means to a position above said feeding conveyor means so as to allow continued advancement of successive article carrying pallets by said feeding conveyor means under the raised group of article carrying pallets, said raised group of pallets being said assembly of pallets.

15. The combination as defined in claim 14, wherein said rack is located in a concrete block curing kiln, and the articles carried by said pallets at said pick-up station are uncured concrete blocks while the articles carried by said pallets at said delivery station are cured concrete blocks.

16. The combination as defined in claim 14, further including a second accumulator means located at said delivery station and including means to lower onto said retrieving conveyor means an assembly of article carrying pallets delivered at said delivery station.

17. The combination as defined in claim 16, wherein said rack is located in a concrete block curing kiln, and the articles carried by said pallets at said pick-up station are uncured concrete blocks while the articles carried by said pallets at said delivery station are cured concrete blocks.

18. A pallet holder for use in a storage rack having storage compartments arranged in a grid of rows and tiers, within each compartment a pair of spaced, parallel supports extending along the length of the compartment on each side of the latter, said pallet holder adapted to suspend from said supports in any selected compartment an assembly of several article-carrying pallets in end-to-end relation, said assembly being of uniform width throughout its length, said pallet holder comprising a pair of separate, elongated pallet carrying elements disposable along opposite sides of said assembly, the length of each element being substantially equal to the length of said assembly, each element defining a web of uniform width and bordered by a lower, inturned, longitudinal flange to extend under the side edges of the pallets of said assembly and by an upper, outturned, longitudinal flange to hooking onto said supports;

wherein said lower flange is substantially normal to said web and said upper flange is downwardly inclined relative to said web;

wherein said pallet holder is in combination with a system for loading and unloading said assembly into and from a selected compartment of said rack, said system including a pick-up station and a delivery station, both stations including an elongated horizontal support surface of a smaller width than the width of said assembly and on which said assembly can be supported with the sides of said pallets overhanging said support surface, and translation means to translate said element and said assembly from said pick-up station to said selected compartment and from the latter to said delivery station and to translate said elements back to said pick-up station, said translation means including a pair of power operated jaws movable towards and away from each other to engage the underside of said upper outturned flanges of said elements and move said thus suspended elements toward each other and engage under the overhanging side edges of the pallets of said assembly at said pick-up station and to move said suspended elements away from each other to disengage from under the overhanging side edges of the pallets of said assembly at said delivery station and then to return said suspended elements to said pick-up station.

* * * * *